United States Patent
Rollinson et al.

(10) Patent No.: US 9,683,064 B2
(45) Date of Patent: Jun. 20, 2017

(54) METHOD OF MAKING A RESIN

(71) Applicant: Eastman Kodak Company, Rochester, NY (US)

(72) Inventors: Peter David Rollinson, Rochester, NY (US); Peter Steven Alexandrovich, Rochester, NY (US); John Leonard Muehlbauer, Stafford, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 0 days.

(21) Appl. No.: 14/870,429

(22) Filed: Sep. 30, 2015

(65) Prior Publication Data

US 2017/0088648 A1    Mar. 30, 2017

(51) Int. Cl.
| | |
|---|---|
| *C08J 9/00* | (2006.01) |
| *C08J 9/28* | (2006.01) |
| *C08F 212/08* | (2006.01) |
| *G03G 9/087* | (2006.01) |

(52) U.S. Cl.
CPC ....... *C08F 212/08* (2013.01); *G03G 9/08708* (2013.01)

(58) Field of Classification Search
CPC .......................... C08F 212/08; G03G 9/08708
USPC ............... 526/201, 220; 430/109.31
See application file for complete search history.

(56) References Cited

U.S. PATENT DOCUMENTS

| | | | |
|---|---|---|---|
| 2,566,567 | A | 9/1951 | Hutchinson et al. |
| 2,932,629 | A | 4/1960 | Wiley |
| 3,995,096 | A | 11/1976 | Flatau et al. |
| 4,912,009 | A | 3/1990 | Amering et al. |
| 5,414,062 | A | 5/1995 | Lundquist |
| 7,445,879 | B2 | 11/2008 | Hsieh et al. |
| 9,029,431 | B2 | 5/2015 | Nair et al. |
| 2010/0190103 | A1* | 7/2010 | Jang .................. G03G 9/08711 430/137.15 |

OTHER PUBLICATIONS

Jerca et al. (Synthesis of a new oxazoline macromonomer for dispersion polymerization, Polym. Bull. (2011) 66:785-796, Published online: Jun. 4, 2010).*

* cited by examiner

*Primary Examiner* — Ling Choi
*Assistant Examiner* — Chun-Cheng Wang
(74) *Attorney, Agent, or Firm* — Raymond L. Owens; J. Lanny Tucker

(57) ABSTRACT

A method of making a resin, includes forming an aqueous monomer droplet suspension, and colloidally stabilizing the suspension with a solid particulate material as the first stabilizer and poly(2-ethyl-2-oxazoline) as a second stabilizer. The method further includes heating the colloidally stabilized suspension to polymerize the monomer droplets, thereby forming the resin.

9 Claims, No Drawings

METHOD OF MAKING A RESIN

FIELD OF THE INVENTION

This invention pertains to the field of making resins by suspension polymerization of non-polar monomers in aqueous dispersion, and particularly to suspension polymerization processes where the suspending agent is a particulate inorganic material, where the colloidal stability of the suspension is improved through the use of a particular class of co-stabilizer materials.

BACKGROUND OF THE INVENTION

Suspension polymerization is a heterogeneous radical polymerization process that uses mechanical agitation to mix a monomer or mixture of monomers in a liquid phase, such as water, while the monomers polymerize, forming spheres of polymer. For many non-polar monomers, polymerization in an aqueous dispersion offers a method of eliminating many of the problems in bulk and in solution polymerization, especially the heat dissipation problem in the former and solvent reactivity and removal in the latter. Another feature for large batch preparations is that the polymeric products obtained from a suspension polymerization, if correctly carried out, are in the form of finely granulated beads, typically 0.05 to 1 mm in size. Such beads are readily filtered and dried, and then are readily stored, transported, and directly used by the manufacturing processes used to make final articles or products from the suspension polymerized polymers. The aqueous dispersion polymerization method known as emulsion polymerization utilizes water soluble initiators and forms much smaller polymeric particles, which do not have the ease of handling properties that suspension polymerized beads confer. Polymer prepared in this way is in the form of an extremely fine powder, generally less than 1 micron in size, which must be consolidated by melting, compressing or tabletting to bring it into a form suitable for final use.

Rates and molecular weights for a suspension polymerization reaction are identical to those expected for bulk polymerizations. The catalyst is dissolved in the monomer, the monomer is dispersed in water, and a dispersion agent is incorporated to stabilize the suspension formed. The monomer can include a mixture of different monomers, such that the polymeric product is a copolymer. The catalyst or polymerization initiator should be soluble in the monomer, but not in water. The suspending or dispersion agents which are generally used fall into one of two classes, water soluble organic polymers or water insoluble inorganic compounds. Examples of the former are poly(vinyl alcohol), poly(acrylic acid), methyl cellulose, gelatin, and various pectins. Examples of the latter are kaolin, magnesium silicates, aluminum hydroxide, silica, calcium carbonate, and calcium phosphate. The suspending agents are believed to stabilize the suspension primarily by preventing or reducing the number of direct collisions between droplets. The inorganic compounds are, in general, more readily removed from the final polymer than are the organic polymer agents. The useful range of the weight ratio of the organic phase monomers to the aqueous phase is typically higher for the inorganic stabilizers than the water soluble organic polymers, thus providing an economic advantage. Maintenance of colloidal stability of the suspension during the course of the polymerization process, typically a number of hours, is critical to industrial practice of the method.

Useful monomers for suspension polymerization include, but are not limited to, styrene, vinyl toluene, o, p or m chlorostyrene, chloromethyl styrene, divinyl benzene, ethylene glycol dimethacrylate, vinyl chloride, vinylidene chloride, vinyl acetate, alpha olefins, butadiene, isobutylene, acrylic monomers such as methyl acrylate, methyl methacrylate, butyl acrylate, and butyl methacrylate. Monomers having significant water solubility, such as acrylic acid or acrylonitrile, can be polymerized efficiently with a suspension process by adding electrolytes to salt out monomer from aqueous solution.

Monomer soluble polymerization initiators and catalysts include, but are not limited to, various peroxides and azo compounds. These materials are generators of free radicals which initiate the addition polymerization of unsaturated monomers. Useful materials are commercially available with differing half-lives at differing temperatures; those skilled in the art can use variables such as concentrations, polymerization temperatures, and choices of initiators or blends thereof to control the rates of polymerization and resulting molecular weights and molecular weight distributions of the final product polymers. Examples of peroxide initiators include benzoyl peroxide, tert-butylperoxide, diacetyl peroxide and lauroyl peroxide. Examples of azo initiators include 2,2'-azodi(isobutyronitrile) and 2,2'-azodi (2-methylbutyronitrile).

Practical problems encountered in suspension polymerization due to inadequate colloidal stability include unstable monomer droplet size, the formation of coagulum that is difficult to wash and separate from the beaded polymer product, and the fouling of the reactor and stirrer surfaces.

U.S. Pat. No. 2,932,629 to Wiley describes suspension polymerization of monomers including styrene, divinyl benzene, chloromethylstyrene and vinylidene chloride using particulate stabilizers including inorganic particles such as bentonite clay and other hydrous mineral oxides, as well as organic particles including raw starch and sulfonated cross-linked polystyrene resins. The use of particles as stabilizing agents is shown to result in desirable uniform size distribution of the resultant polymer compared to suspension polymerizations conducted with a water soluble polymer stabilizer. Wiley suggests the use of low concentrations of water soluble promoter materials such the equimolar condensation product of diethanol amine and adipic acid to assist in the adherence of the particulate stabilizer materials to the interface between the discontinuous organic monomer phase droplets and the continuous aqueous phase. Such a promoter material is useful in the practice of the current invention. Wiley also describes the use of cupric sulfate pentahydrate to inhibit polymerization of monomers in the aqueous phase, which can cause destabilization of the suspension. The cupric sulfate pentahydrate also functions to cause gelation of a thickener such as additional bentonite clay dispersion added after the initial shearing to form monomer droplets in the presence of the particulate stabilizer. It is not desirable to use soluble copper salts in a commercially practical suspension polymerization process due to the adverse environmental effects of copper ions in the rinse water used at the end of the process.

U.S. Pat. No. 2,566,567 to Hutchinson et al. discusses the production of polystyrene beads by a suspension polymerization process. Hutchinson et al describe the difficulty of maintaining the size of beads and control of the process. They assert that "styrene and styrene derivatives pass, during the course of their polymerization, through a "tacky" or "sticky" stage when the tendency of particles thereof to coalesce is very pronounced and a subsequent disruption or separation of coalesced particles is difficult. They propose a two-stage process where a partially polymerized viscous liquid mixture of a monomer and a polymer is dispersed in a heated aqueous medium until the polymerization is completed. They also propose a complex vertical reaction system to conduct such polymerizations.

Commonly-assigned U.S. Pat. No. 4,912,009 to Amering et al. describes the production of toner which uses a suspension polymerized styrene-acrylic copolymer as the binder resin. The suspension polymerization process incorporates a complex of hydrophilic silica with a polyester promoter polymer of a lower alkylene dicarboxylic acid and an amino alkanol as the stabilizing species. An example of the promoter is poly(2-methylaminoethanoladipate). Amering et al state that a water soluble substance is required to prevent the emulsion or solution polymerization of monomers in the aqueous phase, a preferred example of such is potassium dichromate. Others are said to include sodium nitrite, copper salts and phenols, however the only example given is potassium dichromate.

U.S. Pat. No. 7,445,879 to Hsieh et al describes the direct preparation of toner by a suspension polymerization method. Ingredients necessary to the function of a suspension polymerized polymeric bead as a toner such as pigment, wax and charge control agent are added to a styrene, butyl methacrylate, azo free radical initiator mixture. This organic phase is dispersed in an aqueous phase where silica is the suspension stabilizer, polyvinylamine is the promoter species, and sodium dichromate is the water soluble free radical scavenger to enhance suspension stability. They also discuss various optional surfactants including water soluble polymers.

U.S. Pat. No. 5,414,062 to Lundquist describes a process for reducing the formation of aqueous phase polymer during the suspension polymerization of vinyl monomers. The reduction of polymer formation in the aqueous phase and subsequent fouling of polymerization reactor surfaces is achieved by incorporating an effective amount of water-soluble peroxide compound into the aqueous phase used for the suspension polymerization. Hydrogen peroxide, sodium perborate and sodium percarbonate are effective aqueous phase inhibitors for use in the preparation of cross-linked polystyrene beads. The suspension stabilizer used in the examples of U.S. Pat. No. 5,414,062 is a mixture of sodium hydroxide, boric acid, polyacrylic acid polymer and gelatin. The reaction is run at a disadvantageous low level of monomers of about 10%.

U.S. Pat. No. 3,995,096 to Flatau et al. describes the reduction of encrustations on reactor walls during the suspension polymerization of vinyl chloride when hydrogen peroxide is used in the aqueous phase at 0.0005% to 0.05% based on the weight of monomers. The patent states that other oxidizing additives including permanganates, dichromates, chromates, cerium(IV) sulfates, copper oxide, and lead oxide among others are less effective in reducing reactor fouling.

Commonly-assigned U.S. Pat. No. 9,029,431 to Nair et al. describes the preparation of porous polymer particles by a suspension process where an organic phase comprising solvent including dissolved resin and dispersed hydrocolloid is dispersed in an aqueous phase containing a particulate suspension stabilizer plus other co-stabilizing species. Porous particles are produced upon removal of the solvent, the shape of which is controlled by use of a water soluble shape control agent added to the aqueous phase after the dispersion of the organic phase in the aqueous phase but before the removal of the solvent. Without the shape control agent the particles are spherical; with shape control agent irregular and folded shapes can be produced. Polyethyloxazoline is listed among other species as a more desirable shape control agent.

SUMMARY OF THE INVENTION

There is thus a need for an improved suspension polymerization process that incorporates the advantages of particulate stabilization and results in a reduction in reactor fouling, but does not require the use of toxic second stabilizer materials, such as copper salts, dichromate salts or phenols.

In accordance with the present invention there is provided a method of making a resin, comprising:
 forming an aqueous monomer droplet suspension;
 colloidally stabilizing the suspension with a solid particulate first stabilizer and a second stabilizer, including poly (2-ethyl-2-oxazoline);
 heating the colloidally stabilized suspension to polymerize the monomer droplets; and
 thereby forming the resin.

The improved suspension polymerization method based on a solid particulate first suspension stabilizer and a poly (2-ethyl-2-oxazoline) second stabilizer exhibits enhanced colloidal stability and reduced reactor fouling.

It is a feature of the invention that resins made in accordance therewith are particularly suitable for use in toners of electrophotographic printing machines with the advantages of ease and cost of manufacturing of the resin, the absence of toxic stabilizing materials, and ease of manufacture of the toner.

DETAILED DESCRIPTION OF THE INVENTION

The improved method for making a resin provided by the present invention includes suspension polymerization processes where the suspending or dispersing agents include solid particulate materials which are water insoluble inorganic compounds. Useful suspending agents include, but are not limited to, kaolin, magnesium silicates, aluminum hydroxide, silica, calcium carbonate, and calcium phosphate. Useful monomers for suspension polymerization include, but are not limited to, styrene, vinyl toluene, o, p or m chlorostyrene, chloromethyl styrene, divinyl benzene, ethylene glycol dimethacrylate, vinyl chloride, vinylidene chloride, vinyl acetate, alpha olefins, butadiene, isobutylene, acrylic monomers such as methyl acrylate, methyl methacrylate, butyl acrylate, and butyl methacrylate. Monomers having significant water solubility, such as acrylic acid or acrylonitrile, can be polymerized efficiently with a suspension process by adding electrolytes to salt out monomer from aqueous solution. Monomer soluble polymerization initiators and catalysts include, but are not limited to, various peroxides and azo compounds. Useful materials are generators of free radicals which initiate the addition polymerization of unsaturated monomers. Such materials are commercially available with differing half-lives at differing temperatures; those skilled in the art of suspension polymerization can use variables such as initiator concentrations, polymerization temperatures, and choices of initiators or blends thereof to control the rates of polymerization and resulting molecular weights and molecular weight distributions of the final product polymers. Examples of useful peroxide initiators include benzoyl peroxide, tert-butylperoxide, diacetyl peroxide and lauroyl peroxide. Examples of useful azo initiators include 2,2'-azodi(isobutyronitrile) and 2,2'-azodi(2-methylbutyronitrile).

The inventive use of poly(2-ethyl-2-oxazoline) as a co-stabilizer in a suspension polymerization process where the first stabilizer is a particulate material is illustrated in the following examples. For both the inventive examples and comparative examples the common equipment, reaction conditions, organic phase ingredients and aqueous phase ingredients used for all are described as follows. The monomer phase, or organic phase, comprised 46 g of styrene, 13.7 g of butyl acrylate, 0.2 g of divinylbenzene (55% active), and 1.7 g of 2,2'-azodi(2-methylbutyronitrile) initiator, Perkadox AMBN from AkzoNobel. The aqueous phase comprised 70 g of water, 0.74 g of Nalcoag 1060 as the primary particulate stabilizer, a colloidal silica dispersion at 50% solids in water from Nalco Company, and 0.35 g of poly(adipic acid-co-methylaminoethanol) from Eastman Kodak Company as a promoter. The promoter species is used to enhance the hydrophilic/hydrophobic balance of the solid dispersing agent in aqueous suspension such that it has an increased tendency to adhere to the organic phase/aqueous phase boundary. The organic and aqueous phases were first agitated for 30 seconds at 4000 to 5000 rpm in a Pro300D rotor/stator mixer from Pro Scientific, Inc. prior to loading in the reactor. The suspensions of organic monomer phases in the aqueous phases containing stabilizing ingredients were first formed in this manner before addition to the stirred reactor flask. Suspension polymerization reactions were carried out for 4 hours at a temperature of 76 C in a 250 ml 3-necked flask equipped with a stirrer running at 250 rpm. For both the inventive examples and the comparative examples additional ingredients in either the organic phase or aqueous phase are listed in the tables that follow. The results of the suspension polymerization examples are expressed in two ways. For successful reactions the colloidal stability is listed as effective if a polymeric bead product was collected. For unsuccessful preparations where the colloidal stability was lost during the course of the reaction the flask contents were observed to set up, in that the desired free-flowing liquid suspension became essentially solid. For examples with effective colloidal stability the cleanliness of the reactor surfaces and visible coagulum were qualitatively rated.

Table 1 describes the inventive examples of a suspension polymerization based on a particulate stabilizer, the colloidal silica Nalcoag 1060, in combination with the water soluble co-stabilizer poly(2-ethyl-2-oxazoline). The poly(2-ethyl-2-oxazoline) was obtained from Polymer Chemistry Innovations, Inc. as Aquazol 50. It was added to the preparations as a 5% solution in water after the suspension had first been formed in the rotor/stator mixer. All of the inventive examples show effective colloidal stability in that useful product was obtained. Inventive Examples 1 and 2 illustrate two levels of poly(2-ethyl-2-oxazoline) at approximately 0.11% and 0.21% based on monomers; the higher amount yielded nearly clean reactor and stirrer surfaces. In example 3 the higher level of poly(2-ethyl-2-oxazoline) was used along with double the amount of silica stabilizer and promoter, the result was still a successful polymerization with clean reactor surfaces but smaller particle size of the resulting beads. Inventive Example 4 illustrates the used of citric acid as a pH buffer at the lower level of poly(2-ethyl-2-oxazoline); the results are indistinguishable from Inventive Example 1 where nothing was added to control pH. The resulting polymeric beads from Inventive Examples 1 through 4 were spherical.

TABLE 1

Inventive Examples

|  | Inventive Example 1 | Inventive Example 2 | Inventive Example 3 | Inventive Example 4 |
|---|---|---|---|---|
| Organic Phase |  |  |  |  |
| styrene | 46. g | 46. g | 46. g | 46. g |
| butyl acrylate | 13.7 g | 13.7 g | 13.7 g | 13.7 g |
| divinyl benzene (55% active) | 0.2 g | 0.2 g | 0.2 g | 0.2 g |
| Perkadox AMBN | 1.7 g | 1.7 g | 1.7 g | 1.7 g |

TABLE 1-continued

Inventive Examples

|  | Inventive Example 1 | Inventive Example 2 | Inventive Example 3 | Inventive Example 4 |
|---|---|---|---|---|
| Aqueous Phase |  |  |  |  |
| water | 70. g | 70. g | 70. g | 70. g |
| Nalcoag 1060 | 0.74 g | 0.74 g | 1.35 g | 0.74 g |
| poly(adipic acid-co-methylaminoethanol) | 0.35 g | 0.35 g | 0.66 g | 0.35 g |
| Aqueous Phase Additive |  |  |  |  |
| 5% poly(2-ethyl-2-oxazoline) | 1.32 g | 2.5 g | 2.5 g | 1.32 g |
| citric acid |  |  |  | 0.3 g |
| Results |  |  |  |  |
| colloidal stability | effective | effective | effective | effective |
| reactor fouling and coagulum | some | very little | very little | some |

Table 2 describes comparative examples of suspension polymerization reactions based on a particulate stabilizer, the colloidal silica Nalcoag 1060. Comparative Example 1 illustrates a successful polymerization based on a particulate stabilizer through the use of potassium dichromate as a co-stabilizer as illustrated in U.S. Pat. No. 4,912,009. Compounds such as potassium dichromate or sodium dichromate, which is described as a co-stabilizer in U.S. Pat. No. 7,445,879, are toxic and thus are not desirable for industrial use. Commonly used stabilizers for suspension polymerizations include polyvinyl alcohol and gelatin, which were tested as co-stabilizers with a particulate primary stabilizer in Comparative Examples 3 and 4, respectively. The polyvinyl alcohol was obtained from Nippon Goshei as GH-17; the gelatin was obtained from Eastman Kodak Co. as Type 40 Gelatin. They were added to the reaction mixtures as solutions in water after the suspensions were initially formed by agitation in the rotor/stator mixer. The resulting colloidal stability of both suspension polymerizations was poor and the reactions set up. The initial suspensions were stable for these and all of the other comparative examples to be described. The loss of stability, resulting in the formation of coagulum and the fouling of reactor and stirrer surfaces, happens as the reaction progresses. There appears to be a stage where the suspended droplets of monomer now containing polymer are sticky and cause the process to fail catastrophically.

TABLE 2

Comparative Examples

|  | Comp. Example 1 | Comp. Example 2 | Comp. Example 3 | Comp. Example 4 |
|---|---|---|---|---|
| Organic Phase |  |  |  |  |
| styrene | 46. g | 46. g | 46. g | 46. g |
| butyl acrylate | 13.7 g | 13.7 g | 13.7 g | 13.7 g |
| divinyl benzene (55% active) | 0.2 g | 0.2 g | 0.2 g | 0.2 g |
| Perkadox AMBN | 1.7 g | 1.7 g | 1.7 g | 1.7 g |
| Aqueous Phase |  |  |  |  |
| water | 70. g | 70. g | 70. g | 70. g |
| Nalcoag 1060 | 0.74 g | 0.74 g | 0.74 g | 0.74 g |
| poly(adipic acid-co-methylaminoethanol) | 0.35 g | 0.35 g | 0.35 g | 0.35 g |
| Aqueous Phase Additive |  |  |  |  |
| potassium dichromate | 0.005 g |  |  |  |
| hydrogen peroxide |  | 1 ml |  |  |

TABLE 2-continued

Comparative Examples

|  | Comp. Example 1 | Comp. Example 2 | Comp. Example 3 | Comp. Example 4 |
|---|---|---|---|---|
| 10% GH-17 polyvinyl alcohol |  |  | 4. g |  |
| 33% Type 40 Gelatin |  |  |  | 0.6 g |
| Results |  |  |  |  |
| colloidal stability | effective | set up | set up | set up |
| reactor fouling and coagulum | some |  |  |  |

Table 3 describes comparative examples of suspension polymerization reactions based on a particulate stabilizer, the colloidal silica Nalcoag 1060. The present inventive poly(2-ethyl-2-oxazoline) co-stabilizer material is described in commonly-assigned U.S. Pat. No. 9,029,431 as useful for control of the shape of particles prepared in a method involving an organic phase includes a water immiscible organic solvent containing dissolved and dispersed ingredients suspended in an aqueous phase with a particulate stabilizer. The shaped particles result when the solvent is removed. U.S. Pat. No. 9,029,431 also describes fatty acid modified polyesters including EFKA 6225 and EFKA 6220 as effective shape control agents for such particle preparations. Comparative Example 5 and Comparative Example 6 describe the use of EFKA 6225 and EFKA 6220 obtained from BASF Corp. as co-stabilizers when added to the organic monomer phase of an otherwise identical suspension polymerization to that of Inventive Example 1 where the inventive poly(2-ethyl-2-oxazoline) additive is not included. These materials are seen to be ineffective as co-stabilizers as the reactions set up during the course of the polymerization. The utility of poly(2-ethyl-2-oxazoline) as a co-stabilizer for a suspension polymerization based on a particulate stabilizer is thus not anticipated by the art described in U.S. Pat. No. 9,029,431.

Commonly assigned U.S. Pat. No. 7,655,375 describes metal salts which are also useful as shape control agents in similar particle preparation methods utilizing particulate stabilized suspensions of solvent based organic phases in aqueous phases followed by solvent evaporation. Potassium nitrate is one of the effective salts described, however in Comparative Example 7 it is seen to be ineffective as a co-stabilizer for a suspension polymerization based on a particulate stabilizer.

TABLE 3

Comparative Examples

|  | Comp. Example 5 | Comp. Example 6 | Comp. Example 7 |
|---|---|---|---|
| Organic Phase |  |  |  |
| styrene | 46. g | 46. g | 46. g |
| butyl acrylate | 13.7 g | 13.7 g | 13.7 g |
| divinyl benzene (55% active) | 0.2 g | 0.2 g | 0.2 g |
| Perkadox AMBN | 1.7 g | 1.7 g | 1.7 g |
| Aqueous Phase |  |  |  |
| water | 70. g | 70. g | 70. g |
| Nalcoag 1060 | 0.74 g | 0.74 g | 0.74 g |
| poly(adipic acid-co-methylaminoethanol) | 0.35 g | 0.35 g | 0.35 g |
| Aqueous Phase Additive |  |  |  |
| 5% aluminum nitrate | 1.32 g |  |  |
| Organic Phase Additive |  |  |  |
| EFKA 6225 |  | 0.032 g |  |
| EFKA 6220 |  |  | 0.032 g |
| Results |  |  |  |
| colloidal stability | set up | set up | set up |

Table 4 describes comparative examples where control of pH was used in an attempt to improve the colloidal stability of a suspension polymerization based on a colloidal silica stabilizer, Nalcoag 1060. Controlling pH to a value of approximately 4 when using colloidal silica materials such as Nalcoag 1060 as stabilizers can result in improved colloidal stability of solvent based suspension particle preparations such as those described in U.S. Pat. No. 7,655,375 and U.S. Pat. No. 9,029,431. Comparative Examples 8, 9, 10 and 11 describe, respectively, the use of nitric acid, sulfuric acid, potassium phthalate and citric acid to control the pH to a value of approximately 4 of the aqueous phase of suspension polymerization reactions like those described in the previous inventive and comparative examples. None of these resulted in maintaining colloidal stability through the course of the reaction. Comparative Example 12 was based on the same formula as Comparative Example 11 where citric acid was used to control pH, except that benzoyl peroxide was used as the polymerization initiator instead of the azo initiator Perkadox AMBN. The result was again an unsuccessful suspension polymerization reaction. The inventive poly(2-ethyl-2-oxazoline) co-stabilizer used in a suspension polymerization reaction based on a particulate primary stabilizer does not require the control of pH in the inventive examples shown earlier.

TABLE 4

Comparative Examples

|  | Comp. Example 8 | Comp. Example 9 | Comp. Example 10 | Comp. Example 11 | Comp. Example 12 |
|---|---|---|---|---|---|
| Organic Phase |  |  |  |  |  |
| styrene | 46. g | 46. g | 46. g | 46. g | 46. g |
| butyl acrylate | 13.7 g | 13.7 g | 13.7 g | 13.7 g | 13.7 g |
| divinyl benzene (55% active) | 0.2 g | 0.2 g | 0.2 g | 0.2 g | 0.2 g |
| Perkadox AMBN | 1.7 g | 1.7 g | 1.7 g | 1.7 g |  |
| benzoyl peroxide |  |  |  |  | 2.2 g |
| Aqueous Phase |  |  |  |  |  |
| water | 70. g | 70. g | 70. g | 70. g | 70. g |
| Nalcoag 1060 | 0.74 g | 0.74 g | 0.74 g | 0.74 g | 0.74 g |

TABLE 4-continued

| | Comparative Examples | | | | |
|---|---|---|---|---|---|
| | Comp. Example 8 | Comp. Example 9 | Comp. Example 10 | Comp. Example 11 | Comp. Example 12 |
| poly(adipic acid-co-methylaminoethanol) Aqueous Phase Additive | 0.35 g | 0.35 g | 0.35 g | 0.35 g | 0.35 g |
| 50% nitric acid | 5 drops | | | | |
| sulfuric acid | | 2 drops | | | |
| potassium phthalate | | | 0.325 g | | |
| citric acid | | | | 0.3 g | 0.3 g |
| Results | | | | | |
| colloidal stability | set up | set up | set up | set up | set up |

Comparison of the inventive examples with the comparative examples illustrates the advantages of suspension polymerization reactions based on a particulate stabilizer and poly(2-ethyl-2-oxazoline) co-stabilizer. The reactions are run at an advantageously high 45% solids content. The size of the beads is modulated by the quantity of particulate stabilizer. The reactions show a reduction of reactor fouling, without requiring a toxic additive such as potassium dichromate as described in U.S. Pat. No. 4,912,009 or sodium dichromate as described in U.S. Pat. No. 7,445,879. Ingredients to control pH are not necessary. The unanticipated result is seen that ordinary water soluble suspension stabilizers such as polyvinyl alcohol and gelatin are ineffective compared to the inventive poly(2-ethyl-2-oxazoline) when used as co-stabilizers with a particulate first stabilizer.

The preparation of useful toner incorporating a resin prepared from the present inventive process is illustrated below as Inventive Toner Example 1. A resin of essentially identical composition to that of Inventive Example 1 was prepared, however at larger scale in a 22 liter flask. This resin is described as Inventive Example 5 in Table 5 below. The organic and aqueous phase ingredients were added to the flask at ambient temperature, and stirred at 400 rpm for 10 min to achieve the desired droplet size. The stirrer was then reduced to 175 rpm, and the poly(2-ethyl-2-oxazoline) second stabilizer was added. The flask was warmed to and held at 76 C for four hours to affect the majority of the polymerization reaction. Then 5.66 grams of an anti-foaming agent, Mazu DF204 obtained from BASF Corporation, was added and the flask was heated to 90 C for an additional three hours to complete the polymerization. A vacuum was then applied and the flask was held at 66 C for 5 hours to remove volatile components including residual monomer and initiator decomposition by-products. The resin product was collected on a filter and washed with 3 liters of distilled water.

TABLE 5

| Inventive Example | |
|---|---|
| | Inventive Example 5 |
| Organic Phase | |
| styrene | 5529. g |
| butyl acrylate | 1562.1 g |
| divinyl benzene (55% active) | 22.65 g |
| Perkadox AMBN | 192.45 g |

TABLE 5-continued

| Inventive Example | |
|---|---|
| | Inventive Example 5 |
| Aqueous Phase | |
| water | 7875. g |
| Nalcoag 1060 | 73.65 g |
| poly(adipic acid-co-methylaminoethanol) Aqueous Phase Additive | 37.95 g |
| 5% poly(2-ethyl-2-oxazoline) | 270. g |
| Results | |
| colloidal stability | effective |
| reactor fouling and coagulum | some |

Inventive Toner Example 1 was prepared from the combination of three replicate runs of Inventive Example 5 resin. Inventive Toner Example 1 had a core particle consisting of 90.3% resin (Inventive Example 5), 6.3% Regal 330 carbon black obtained from Cabot Corporation, 1.8% T-77 charge control agent obtained from Hodogaya Chemical Inc., and 1.6% Licowax PE-130 polyethylene wax obtained from Clariant Corporation. These ingredients were melt mixed on a 30 mm Werner and Pfleiderer extruder, pelletized, ground into core toner on an Alpine 100AFG jet mill pulverizer, followed by air classification on an Alpine 50ATP classifier to remove the finer end of the toner particle size distribution. The resulting core toner had a volume median particle size of 11.0 microns as determined by the Coulter Counter method. The final complete toner was prepared by mixing 99.78% of the core toner with 0.22% of R972 fumed hydrophobic silica external additive, obtained from Evonik Corporation, on a 10 liter Henschel mixer running at 3000 rpm for 2 minutes.

Comparative Toner Example 1 was prepared from a resin of essentially identical in composition to that of Comparative Example 1 as described in Table 2, which was obtained from Nashua Corporation as N89016 resin. The steps of extrusion, pulverization, classification and mixing with the external additive were conducted as above for Inventive Toner Example 1. The volume median particle size was 10.7 microns by the Coulter Counter method. The utility of Inventive Toner Example 1 and Comparative Toner Example 1 were assessed by measurements of melt rheological properties and calorimetric properties which are important for the fusing of toner to paper, and triboelectric properties which are important to the electrostatic toning process. These toners were judged to be equivalent in these performance characteristics. Inventive Toner Example 1 however does not contain the toxic second stabilizer potassium dichromate that is required to achieve colloidal stability in the resin manufacture of Comparative Toner Example 1.

The invention has been described in detail with particular reference to certain preferred embodiments thereof, but it will be understood that variations and modifications can be effected within the spirit and scope of the invention.

The invention claimed is:

1. A method for making a resin, comprising:
forming an aqueous suspension of droplets of one or more monomers in an aqueous medium that further comprises a polymerization initiator or catalyst, a promoter species, and a first stabilizer that is a solid particulate inorganic compound,
providing a second stabilizer in the aqueous suspension to provide a colloidally stabilized suspension, which second stabilizer is a poly(2-ethyl-2-oxazoline) homopolymer, and
heating the colloidally stabilized suspension to polymerize the one or more monomers in the droplets, thereby forming particles of the resin.

2. The method of claim 1, where the first stabilizer comprises colloidal silica particles.

3. The method of claim 1, wherein the one or more monomers comprise one or more of styrene, vinyl toluene, o-, p- or m-chlorostyrene, chloromethyl styrene, divinylbenzene, ethylene glycol dimethacrylate, vinyl chloride, vinylidene chloride, vinyl acetate, alpha olefins, butadiene, isobutylene, methyl acrylate, methyl methacrylate, butyl acrylate, and butyl methacrylate.

4. The method of claim 1, wherein the one or more monomers comprises divinylbenzene or ethylene glycol dimethacrylate.

5. The method of claim 1, wherein the promoter species comprises poly(adipic acid-co-methylaminoethanol).

6. The method of claim 1, wherein the polymerization initiator or catalyst is a peroxide or azo compound.

7. The method of claim 1, wherein the second stabilizer is provided in the aqueous suspension with the first stabilizer.

8. The method of claim 1, wherein the first stabilizer comprises colloidal silica particles; the one or more monomers comprise styrene, divinylbenzene, and butyl acrylate, the promoter species is poly(adipic acid-co-methylaminoethanol); and the polymerization initiator or catalyst is a peroxide.

9. The method of claim 1, wherein the amount of second stabilizer is at least 0.11 weight % and up to and including 0.21 weight %, based on the total weight of the one or more monomers.

* * * * *